UNITED STATES PATENT OFFICE.

FRITZ HOFMANN AND KONRAD DELBRÜCK, OF ELBERFELD, GERMANY, ASSIGNORS TO FARBENFABRIKEN VORM. FRIEDR. BAYER & CO., OF ELBERFELD, GERMANY, A CORPORATION OF GERMANY.

VULCANIZED CAOUTCHOUC AND PROCESS OF MAKING SAME.

1,081,613.     Specification of Letters Patent.     Patented Dec. 16, 1913.

No Drawing.     Application filed April 5, 1912. Serial No. 688,761.

*To all whom it may concern:*

Be it known that we, FRITZ HOFMANN and KONRAD DELBRÜCK, doctors of philosophy, chemists, citizens of the German Empire, residing at Elberfeld, Germany, have invented new and useful Improvements in Vulcanized Caoutchouc and Processes of Making Same, of which the following is a specification.

In our companion application Serial No. 688,762, filed of even date herewith, we have described the conversion of the autopolymerization product of beta-gamma-dimethylerythrene, which is a brittle, spongy substance (see Kondakow, *Journal für Praktische Chemie*, 64, p. 109/110) into a compact stable product by treatment with basic compounds such as ammonia, anilin, dimethylamin, diethylamin, dimethylanilin, dimethyl-orthotoluidin, caustic soda, etc. We have found that the resulting stable compounds which still contain part or all of the basic compounds can be vulcanized, yielding excellent vulcanized products. This fact, is all the more surprising as the autopolymerization product itself produced by Kondakow is scarcely suitable for this purpose.

As described in our companion application 688,762, the white autopolymerization product can be treated with basic compounds in various ways to give the desired stable product; for example, by macerating the autopolymerization product with dilute anilin water, by mixing the product with dimethyl-orthotoluidin, by forming an additional amount of beta-gamma-dimethylerythrene caoutchouc in the presence of the autopolymerization product and of dimethylanilin, etc.

In order to illustrate the new process more fully the following example is given, the parts being by weight:—20 parts of the product obtainable by the process of our application filed simultaneously and 2 parts of sulfur are intimately mixed together on the mixing rolls. The mixture thus obtained is then heated for about 1 hour to 135°. An elastic sheet of good firmness and tenacity is thus obtained, containing the vulcanized autopolymerization product of beta-gamma-dimethylbutadiene combined with the small amount of added basic substance.

Other methods of vulcanizing caoutchouc can be used.

We claim:—

The herein described new material being a vulcanized autopolymerization product of beta-gamma-dimethylbutadiene combined with a small amount of a basic substance, being a whitish nonadhesive substance, containing sulfur, and which on treatment with ozone, forms an ozonid which upon decomposition with water yields among its decomposition products acetonylacetone.

In testimony whereof we have hereunto set our hands in the presence of two subscribing witnesses.

FRITZ HOFMANN. [L. S.]
KONRAD DELBRÜCK. [L. S.]

Witnesses:
HELEN NUFER,
ALBERT NUFER.